(12) United States Patent
Pead

(10) Patent No.: US 11,128,681 B2
(45) Date of Patent: *Sep. 21, 2021

(54) METHODS AND APPARATUS FOR PROVIDING SOCIAL VIEWING OF MEDIA CONTENT

(71) Applicant: DISH Technologies L.L.C., Englewood, CO (US)

(72) Inventor: Scott Pead, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,365

(22) Filed: Jun. 22, 2020

(65) Prior Publication Data

US 2020/0329082 A1 Oct. 15, 2020

Related U.S. Application Data

(63) Continuation of application No. 14/145,025, filed on Dec. 31, 2013, now Pat. No. 10,708,319.

(60) Provisional application No. 61/747,583, filed on Dec. 31, 2012.

(51) Int. Cl.
| | |
|---|---|
| *G06F 3/048* | (2013.01) |
| *H04L 29/06* | (2006.01) |
| *G06F 3/0484* | (2013.01) |
| *G06Q 10/10* | (2012.01) |
| *G06Q 50/00* | (2012.01) |

(52) U.S. Cl.
CPC .......... *H04L 65/403* (2013.01); *G06F 3/0484* (2013.01); *G06Q 10/10* (2013.01); *G06Q 50/01* (2013.01)

(58) Field of Classification Search
CPC . H04N 21/4788; G06F 17/3082; G06F 17/24; G06F 3/0481; G06F 3/0484; H04L 65/403; G06Q 10/10; G06Q 50/01
See application file for complete search history.

(56) References Cited

U.S. PATENT DOCUMENTS

| | | | |
|---|---|---|---|
| 8,990,328 B1 * | 3/2015 | Grigsby | G06F 3/0484 |
| | | | 709/206 |
| 2010/0070858 A1 * | 3/2010 | Morris | H04N 21/4788 |
| | | | 715/706 |
| 2010/0306655 A1 * | 12/2010 | Mattingly | G06F 3/0482 |
| | | | 715/720 |
| 2011/0179385 A1 * | 7/2011 | Li | G06F 16/7867 |
| | | | 715/810 |
| 2012/0174157 A1 * | 7/2012 | Stinson, III | H04N 21/47 |
| | | | 725/40 |
| 2012/0265805 A1 * | 10/2012 | Samdadiya | G06F 11/3466 |
| | | | 709/203 |

(Continued)

FOREIGN PATENT DOCUMENTS

WO WO-2012153290 A1 * 11/2012 ........... G06F 3/1446

*Primary Examiner* — Haoshian Shih
(74) *Attorney, Agent, or Firm* — Lorenz & Kopf, LLP

(57) ABSTRACT

A method for social viewing of media content includes transmitting, to multiple users, media content when the multiple users are are members of a common group associated with a social media site (i.e., "friends" or the like) while providing, to the users, an interaction region configured to allow the first user and the second user to share comments with each other regarding the media content via an interaction stream.

20 Claims, 4 Drawing Sheets

(56) References Cited

U.S. PATENT DOCUMENTS

2014/0237510 A1* 8/2014 Phillips .............. H04N 21/4782
725/34

* cited by examiner

METHODS AND APPARATUS FOR PROVIDING SOCIAL VIEWING OF MEDIA CONTENT

CROSS-REFERENCE TO RELATED APPLICATIONS

This application is a continuation of the parent U.S. patent application Ser. No. 14/145,025, filed on Dec. 13, 2013, and claims priority to U.S. Provisional Patent Application No. 61/747,583, filed on Dec. 31, 2012, the contents of both applications are hereby incorporated by reference in the entirety.

TECHNICAL FIELD

The present disclosure generally relates to systems and techniques for processing, viewing, and selecting media content. More particularly, the present disclosure relates to shared viewing of media in the context of social media sites.

BACKGROUND

In recent years, social media sites such as Facebook, Twitter, Google+, and the like have achieved wide popularity. Such sites often allow users to form groups (e.g., "friends", "followers", "circles", etc.) and share information with other users in those groups. At the same time, options for viewing media content have also increased, expanding beyond standard cable television to place-shifting devices, network streaming, and the like. Nevertheless, given the vast amount of media content available, it is often difficult for a user to discover content that he or she might enjoy. Furthermore, it remains difficult for users to share their thoughts regarding media content in a meaningful, social, and enjoyable way.

It is therefore desirable to create systems and methods that provide a social context for shared viewing of media. These and other desirable features and characteristics will become apparent from the subsequent detailed description and the appended claims, taken in conjunction with the accompanying drawings and this background section.

SUMMARY

A method for social viewing of media content in accordance with one embodiment includes transmitting, to a first user, media content via a network; transmitting, to a second user, the media content via the network, wherein the second user and the first user are members of a common group associated with a social media site; and providing, to the first and second users, an interaction region configured to allow the first user and the second user to share comments with each other regarding the media content via an interaction stream.

A system for providing social viewing of media content in accordance with one embodiment includes a media player communicatively coupled to a social media site. The media player is configured to receive media content from a media source. The social media site provides access to a first user and a second user who are members of a common group associated with the social media site, and the social media site provides, to the first and second users, an interaction region configured to allow the first user and the second user to share comments with each other regarding the media content via an interaction stream.

In accordance with another embodiment, non-transitory computer-readable medium bearing software instructions are configured to cause a processor to perform the steps of transmitting, to a first user, media content via a network; transmitting, to a second user, the media content via the network, wherein the second user and the first user are members of a common group associated with a social media site; and providing, to the first and second users, an interaction region configured to allow the first user and the second user to share comments with each other regarding the media content via an interaction stream.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, systems and methods in accordance with the subject matter described herein provide a social context (e.g., via a social media site accessible via a network) for shared viewing of media content while allowing comments, annotations, public discussions, etc. relating to the media content to be shared as a group. In addition, notifications that a user is viewing particular media content may be communicated to "friends" to initiate such sharing in a social context.

Figure 1:
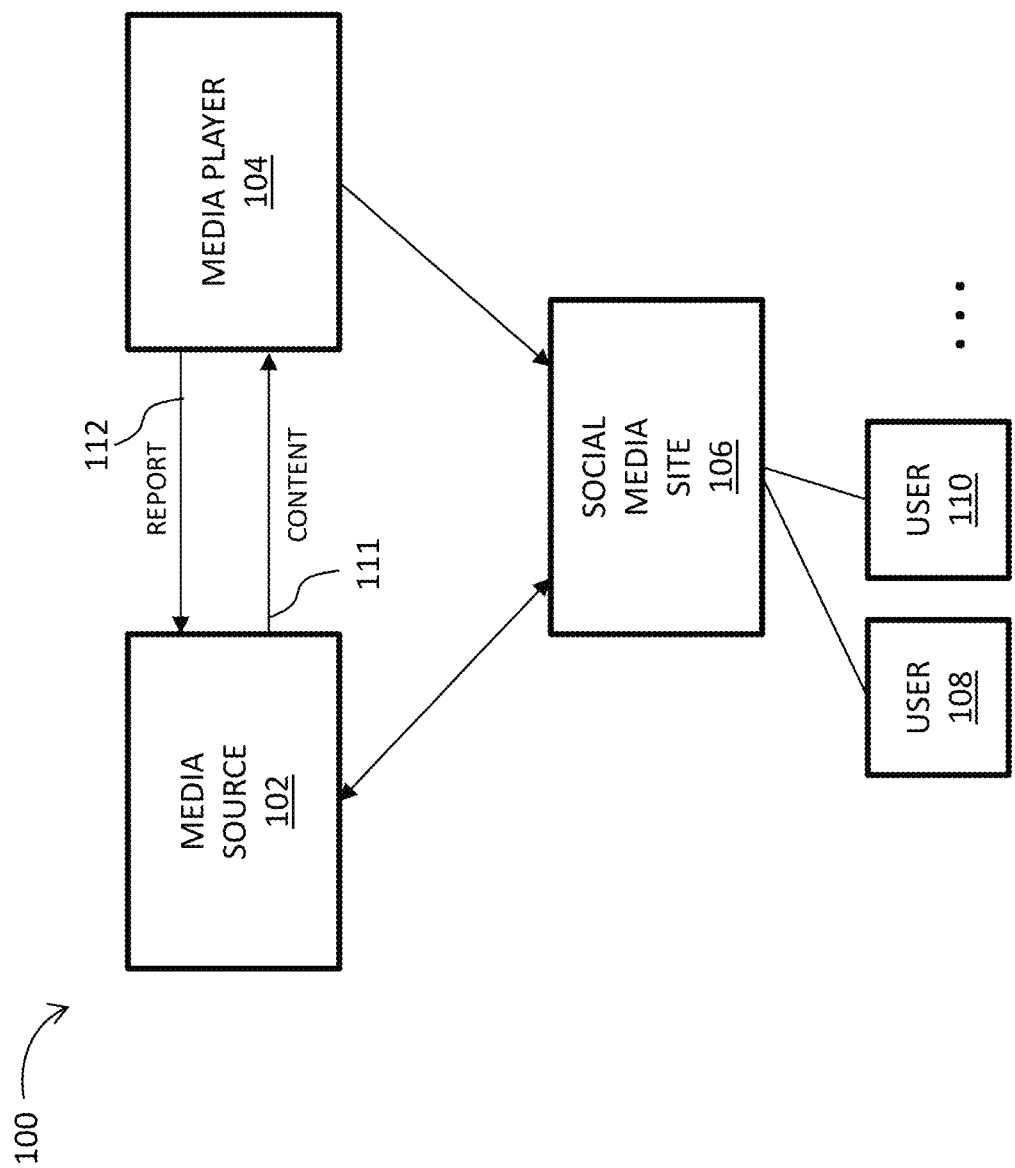
FIG. 1 is a conceptual block diagram of a system in accordance with one embodiment.

Referring now to the conceptual block diagram shown in FIG. 1, a system 100 in accordance with various embodiments generally includes a media source (or simply "source") 102, a media player 104, a social media site 106, and one or more users 108. Media source 102 is communicatively coupled to media player 104 and is configured to provide media content (or simply "content") 111 to media player 104 while receiving information (e.g., a "report" 112) back from media player 104.

Social media site (or simply "site") 106 is communicatively coupled (e.g., via the Internet) to both media source 102 and media player 104. For simplicity, social media site 106 is illustrated as a single block, but those skilled in the art will recognize that social media site 106 might include any number of functional components (servers, processors, databases, etc.) spread out geographically while implementing any number of services (web services, streaming services, etc.). In this regard, "social media site" is used herein in its conventional sense of a system (typically a website accessible via a web browser over the Internet) that allows users 108, 110, etc. to interact with each other in some fashion and to "follow," "friend", or otherwise denote other users as members of a common group associated with the social media site. Without loss of generality, the term "friends" may be used herein generically to refer to users within the same group, circle, friendship, or the like, regardless of whether the mechanism for formation of such groups includes "friending," "following," "placing in a circle," or the like. A non-limiting list of social media sites includes, for example, Google+, Facebook, Twitter, LinkedIn, Pinterest, MySpace, and Foursquare.

Users 108 represent any number of individuals or groups configured to interact with social media site 106 through conventional methods, such as laptops, desktop computers, smart-phones, tablet computers, and the like. In this regard, users 108 will typically have an "account" with social media site 106 such that certain credential are required for logging on and interacting with the site and others on the site.

Media source 102 may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. In some embodiments, media source 102 represents a placeshifting device that incorporates all or a portion of the functionality typically associated with a particular media source 102, for example: a hybrid STB or other receiver that provides transcoding and placeshifting features. Such a device may receive satellite, cable, broadcast and/or other signals that encode television programming or other content received from an antenna, modem, server and/or other source. Such devices may also include a content database to support a personal or digital video recorder (DVR) feature or other content library as appropriate. Stated another way, in some embodiments, media source 102 and a placeshifting device are physically and/or logically contained within a common component, housing or chassis.

Media player 104 may be any device, component, module, hardware, software and/or the like capable of receiving a media stream (or "content") from media source 102. In various embodiments, media player 104 is a desktop computer, a laptop computer, a tablet computer, a mobile phone, a personal digital assistant, a personal media player (such as the ARCHOS products available from the Archos company of Igny, France), a conventional television, or the like. In many embodiments, media player 104 is a general purpose computing device that includes a media player application that is capable of securely connecting to media source 102 and receiving and presenting media content to the user of the device as appropriate. In other embodiments, media player 102 is a standalone or other separate hardware device capable of receiving the media stream and decoding the media stream to provide an output signal that is presented on a television or other display device.

It will be appreciated that the various blocks illustrated in FIG. 1 will typically include a number of additional conventional hardware and/or software components (e.g., storage, memory, controllers, digital signal processors, etc.), which have been left out of the illustration in the interest of simplicity. For example, media source 102 might include hardware that incorporates an encoder and/or transcoder module configured to convert audio/video or other data from into a packetized format that can be transmitted over a network. Media player 104 is configured to provide commands and or to report to one or more of the media sources 102, e.g., to request a desired input signals from that media source. Such commands may be provided over any convenient wired or wireless interface, such as an infrared or other wireless transmitter that emulates remote control commands receivable by the media source 102.

Figure 2:
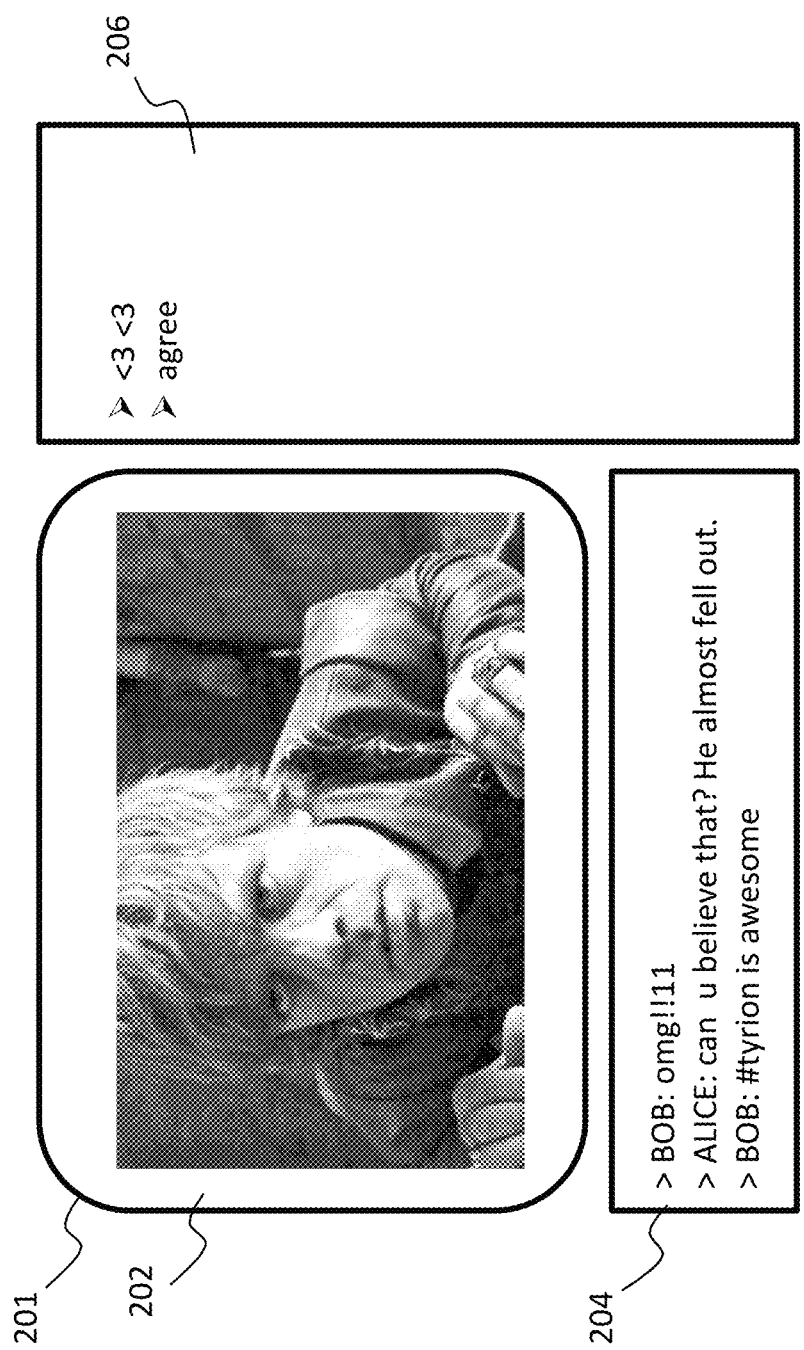
FIG. 2 is a conceptual representation of a shared viewing experience in accordance with one embodiment.
Figure 3:
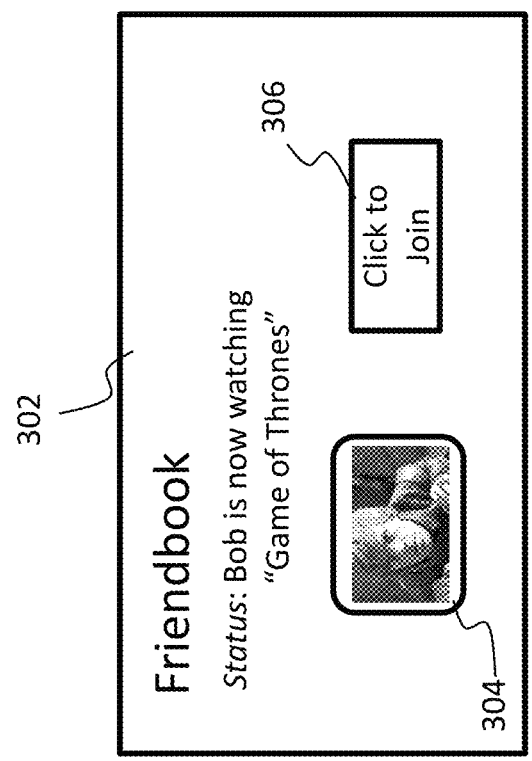
FIG. 3 is a conceptual view of a status update in accordance with one embodiment.

In accordance with various embodiments, users 108 and 110 are able to view certain media content together (via social media site 106) and comment, annotate, or otherwise share information regarding that media content. Referring now to FIGS. 2 and 3 in conjunction with FIG. 1, an example of such an interaction will now be described.

FIG. 2 depicts a media content region 201 in which certain media content 202 (e.g., streamed video, audio, etc.) is provided along with an associated interaction region 204 as those regions might appear displayed within, for example, a conventional web browser window or via any display coupled to media player 104. As shown, interaction region 204 allows multiple users (in this example, "Bob" and "Alice") to comment and interact in real-time (or at different times) as media content 202 is viewed by the users. The resulting discussion is referred to as the "interaction stream."

In this example, the user providing the comment is provided in the text stream (or "chat stream") within interaction region 204. In some embodiments, time-stamps relating to a position within media content 202 may be provided. In various embodiments, users may share within interaction region 204 annotations, observations, comments, links to external sites (e.g., websites relating to a particular show), hashtags (i.e., keywords relating to a subject, event, etc.) relating to the content, and the like.

Comments, text, links, images, and other content provided by users 108 and/or 110 (entered via a keyboard or other user input method) are received by social media site 106 (e.g., via the Internet) along with media content from source 102 and/or media player 104. Social media site 106 then combines the two as shown in FIG. 2. At any given moment, one user might view media content received from media source 102, while another views the same media content from media player 104. That is, the ultimate source of the media content 202 might be invisible to the users. In other embodiments, users may select the media source to be used.

Multiple users may view and comment on media content image 202 in real-time or may do so at a later time or date. In the case of delayed viewing, comments made by one or more friends at certain previous times may be stored and displayed at the appropriate time—i.e., synched with media content 202.

In the illustrated embodiment, media content region 201 is shown directly adjacent and above interaction region 204; however, the invention is not so limited, and any convenient layout scheme for the various regions may be employed. An aggregated or composite display as shown in FIG. 2 might be implemented using a variety of software environments, including, for example, HTML5/CSS/JavaScript, and may be created client-side (e.g., within the user's browser), server-side (e.g., at social media site 106), or a combination thereof.

Report 112 includes information communicated by media player 104 to media source 102 for the purpose of, for example, reporting that a particular user is watching or has watched particular media content. Report 112 might also be shared with other entities, such as social media site 106 or other external sites.

In some embodiments, users may be able to simultaneously view interactions and discussions occurring within additional social media sites (i.e., social media sites external to social media site 106). For example, a Twitter stream or other social media stream 206 relating to the viewed media image may also be displayed in addition to media content image 202 and interaction region 204, as shown in FIG. 2. This stream 206 may be determined, for example, by the content displayed within interaction region 204. That is, social media site may determine, through analysis of the content of interaction region 204 (including text, hashtags, links, etc.) that certain comments (e.g., "tweets", ads, or the like) within stream 206 might be of interest to one or more of the users viewing media content 202. Stream 206 might appear the same for all users viewing media content region 202, or may different, depending upon user-preference or other factors.

In some embodiments, the friends of a user may be notified that the user is currently (or had previously) viewed particular media content, which may be presented individually or as a list. The notification may be initiated, for example, by media player 104, source 102, social media site 106, or any other component or system that is able to determine which user is viewing which content and to report such viewing to social media site 106.

FIG. 3 generally depicts such a notification 302, in which a status message is displayed ("Bob is now watching 'Game of Thrones') on social media site 106, indicating the media content being viewing and the friend (or friends) currently viewing that content. The friend is then provided a mechanism (e.g., any suitable user interface component, such as button 306) to join the conversation. A thumbnail image 304 (corresponding to a still from the media content or corresponding to media content 202 of FIG. 2) may also be provided, which may be static or may change in real-time based on what the user is currently viewing.

The user interfaces associated with the embodiments shown in FIGS. 2 and 3 and indeed any other embodiments may include any number of conventional and well known user interface components (menu items, lists, buttons, check-boxes, and the like), and may be implemented using any suitable computer libraries/languages (e.g., HTML/CSS/JS, Macromedia Flash, a Facebook Widget, or the like). The invention is not so limited, however.

Since social media site 106 will generally know and store (e.g., within a conventional data store) the shared interests, preferences, "likes," "topical hotspots", etc. of users 108 and 110, it can provide notifications to a user's friends based on these common interests. For example, social media site 106 may know that a user Alice is generally interested in the fantasy novel genre, and that "Game of Thrones" generally fits within this genre. As a result, the system may send a notification to Alice letting her know that Bob is currently watching (or had previously watched) that show.

Figure 4:
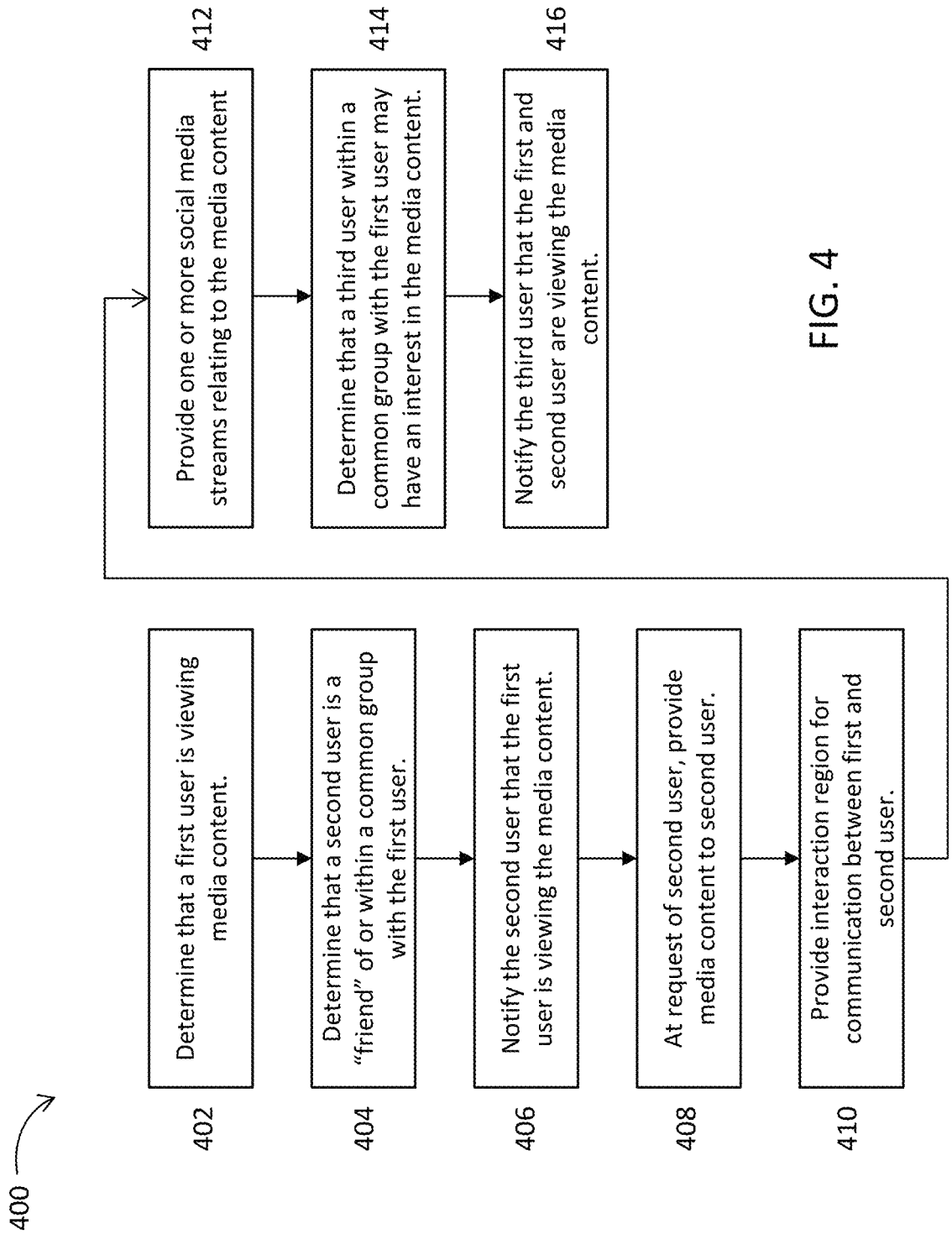
FIG. 4 is a flow chart depicting a method in accordance with one embodiment.

The flow-chart of FIG. 4 provides a single example, or use-case, in which the present invention may be employed. As shown, method 400—which is described from the point-of-view of social media site 106—begins with a determination step 402 that a first user is viewing media content. As a non-limiting example, consider the case where the first user, Bob, has begun to watch a particular episode of a science fiction series received from a media player (e.g., a set-top box) that communicates with social media site 106. The media content may be viewed by Bob within a browser on a desktop, within a smart-TV, or through any other media player 104. Next, in step 404, the system determines a second user who is a "friend" or otherwise within the same social group as Bob, and sends that user (say, Alice), a notification that Bob is watching that episode of the show. The notification may appear as that shown in FIG. 3, with a thumbnail and a button prompting Alice to join Bob in watching the episode (step 406).

If Alice agrees (via clicking a button or the like), the media content is provided to Alice as well (step 408). At the same time, an interaction region is provided to allow Alice and Bob to chat, send links, and so on with respect to the TV episode as it is playing (step 410). The comments may be time-stamped based on the time at which the comments were made relative to the TV episode. One or more social media streams relating to the media content may also be provided to Alice and Bob while they watch the episode. For example, a Twitter feed relating to that particular episode or characters within the episode (e.g., # drwho, # daleks) may also be provided to Alice and Bob during the episode (step 412). In addition, the system might know that a third user (say, Chad) who is a friend of Alice and/or Bob, may be interested in science fiction, based on, for example, previous status updates, previous purchases, previous media consumption, previous books read, and any other information collected by social media site 106 (step 414). Chad may then be notified that Alice and/or Bob are viewing the episode, allowing him to socially view the episode as well (step 416). If Chad joins the social viewing, or later views the episode, he may be able to scroll back through the interaction stream between Alice and Bob (synched with the media content itself) and view previous interactions regarding the episode.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the legal equivalents.

The invention claimed is:

1. A method for social viewing of media content, comprising:
    transmitting, to a first user, media content via a network;
    transmitting, to a second user, the media content via the network, wherein the second user and the first user are members of a common group associated with a social media site; and
    providing, to the first and second users, an interaction region configured to allow the first user and the second user to share comments regarding the media content via an interaction stream,
    wherein the interaction region enables the first user to stream messages in real-time from a social media account of the first user to display to the second user wherein a streamed message displayed is determined by analysis of message content by the social media site to content contained in the interaction region for interest to the second user.

2. The method of claim 1, further including transmitting a notification to the second user indicating that the first user is currently viewing the media content.

3. The method of claim 2, wherein the notification further includes a user interface component offering the second user a capability of viewing the media content simultaneously with the first user.

4. The method of claim 1, wherein the interaction stream includes time-stamp information indicating times relative to the media content that the comments were shared.

5. The method of claim 1, wherein the interaction stream is presented to the second user after the first user has viewed the media content and shared the comments within the interaction stream.

6. The method of claim 1, further including a social media stream provided to at least one of the first and second users while the first user is viewing the media content.

7. The method of claim 6, wherein the social media stream is selected based on the content of the interaction stream.

8. The method of claim 1, further including transmitting a notification to a third user who is a member of the common group based on the media content and profile information associated with the third member on the social media site.

9. The method of claim 1, wherein the media content and the interaction region are rendered together in a web browser window and displayed to the first user while the first user is accessing the social media site.

10. A system for providing social viewing of media content, comprising:
   a computer-implemented device comprising a media player configured to receive media content from a media source; and
   the computer-implemented device in communication with a social media site via the media player wherein the media player is configured for providing access to a first user and a second user who are members of a common group associated with the social media site, wherein the social media site provides, to the first and second users, an interaction region configured to allow the first user and the second user to share comments regarding the media content via an interaction stream wherein the interaction region enables a first user to stream messages in real-time from a social media account of the first user for display to the second user wherein a streamed message displayed is determined by analysis of message content by the social media site to content contained in the interaction region for interest to the second user.

11. The system of claim 10, wherein the social media site is further configured to transmit a notification to the second user indicating that the first user is currently viewing the media content.

12. The system of claim 11, wherein the notification further includes a user interface component offering the second user a capability of viewing the media content simultaneously with the first user.

13. The system of claim 10, wherein the interaction stream includes time-stamp information indicating times relative to the media content that the comments were shared.

14. The system of claim 10, wherein the interaction stream is presented to the second user after the first user has viewed the media content and the shared comments within the interaction stream.

15. The system of claim 10, wherein the social media site further provides a social media stream to at least one of the first and second users while the first user is viewing the media content, and wherein the social media stream is selected based on the content of the interaction stream.

16. The system of claim 10, wherein the social media site is further configured to send a notification to a third user who is a member of the common group based on the media content and profile information associated with the third member on the social media site.

17. The system of claim 10, wherein the media source is communicatively coupled to the social media site.

18. Non-transitory computer-readable medium bearing software instructions configured to cause a processor to perform the steps of:
   transmitting, to a first user, media content via a network;
   transmitting, to a second user, the media content via the network, wherein the second user and the first user are members of a common group associated with a social media site; and
   providing, to the first and second users, an interaction region configured to allow the first user and the second user to share comments regarding the media content via an interaction stream wherein the interaction region enables the first user to stream messages in real-time from a social media account of the first user to display to the second user wherein a streamed message displayed is determined by analysis of message content by the social media site to content contained in the interaction region for interest to the second user.

19. The non-transitory computer-readable medium of claim 18, wherein the software instructions are further configured to cause the processor to transmit a notification to the second user indicating that the first user is currently viewing the media content.

20. The non-transitory computer-readable medium of claim 18, wherein the software instructions are further configured to cause the processor to present the interaction stream to the second user after the first user has viewed the media content and the shared comments within the interaction stream.

* * * * *